Patented Jan. 15, 1935

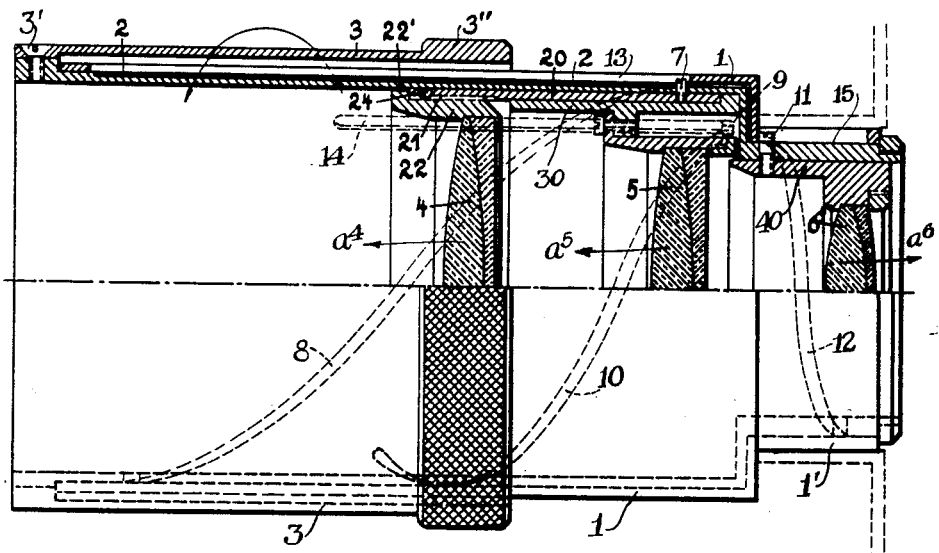
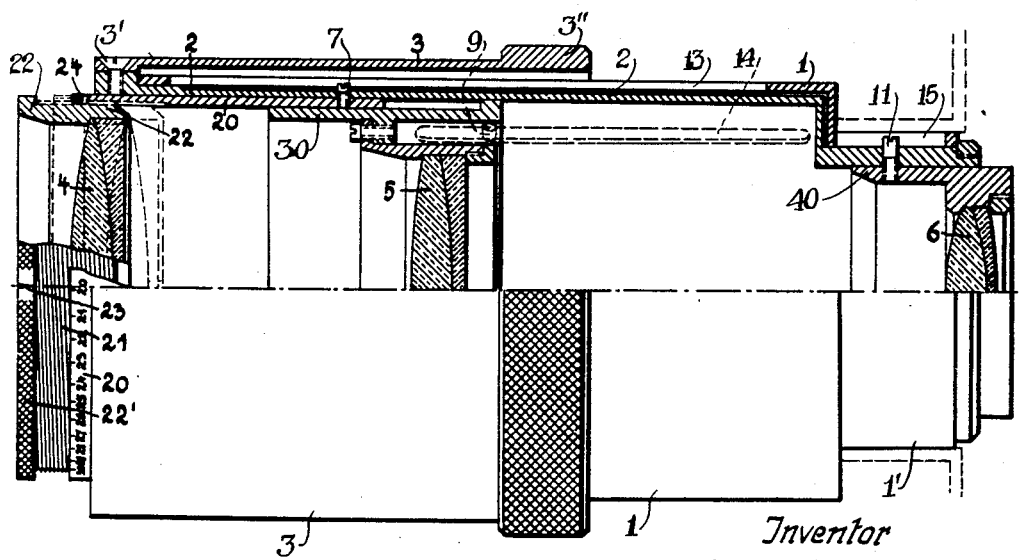

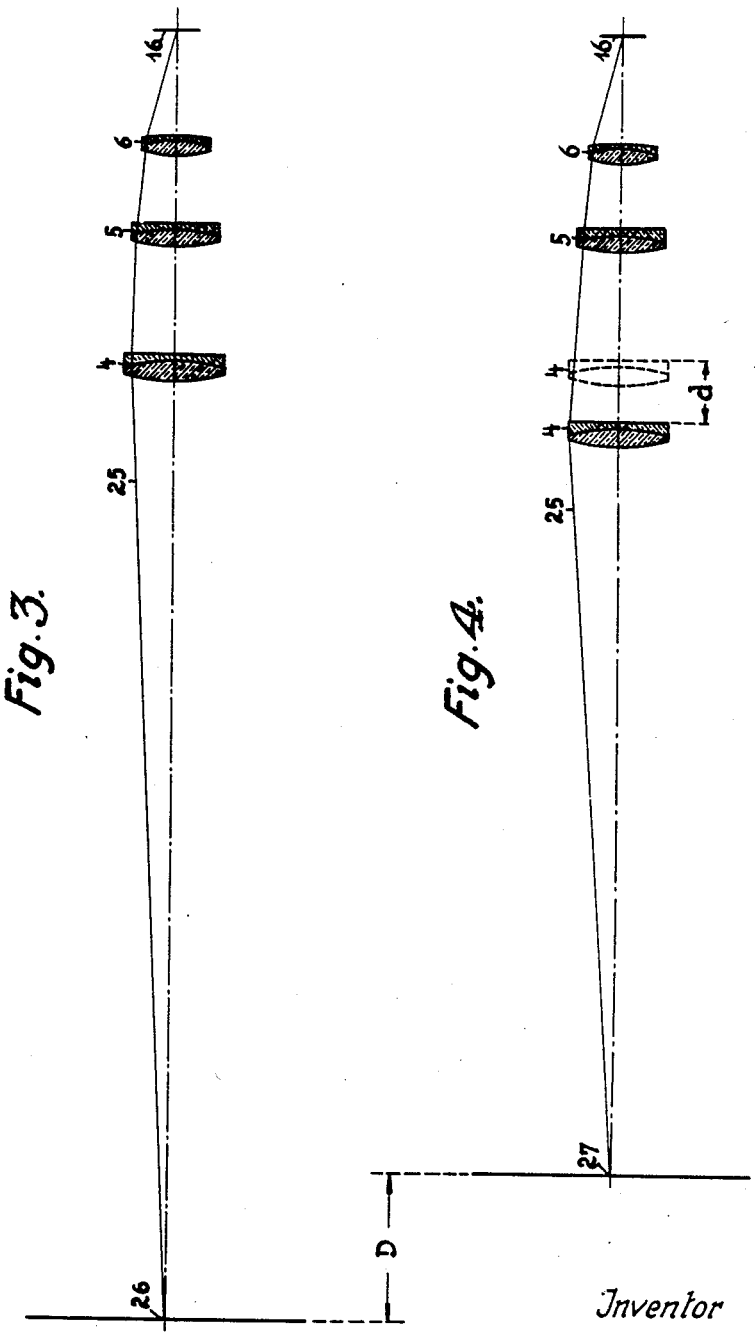

1,988,390

UNITED STATES PATENT OFFICE 1,988,390

CHANGE-FOCUS OBJECTIVE

Helmut Naumann, Rathenow, Germany, assignor to Emil Busch Aktiengesellschaft, Rathenow, Germany Application September 8, 1933, Serial No. 688,565
In Germany March 12, 1931

2 Claims. (Cl. 95—45)

My invention relates to optical lens systems or objectives, hereinafter briefly called lenses, for transmitting images—both in the taking of photographic pictures on a sensitized film or other medium, and in the projection of pictures on a screen—and more particularly to adjustable lenses the equivalent focal length of which can be changed within certain limits by the operator, so as to enlarge in size the pictures transmitted and produce a so-called magnoscopic effect.

The object of this procedure is—as far as the production and projection of motion pictures gradually enlarged in size is concerned—to draw the spectator's attention to a limited section of the scene, for instance to a single person the expression of his or her face, or to a certain object which may ultimately take up the whole screen, and to incidentally give the spectator the illusion of the said object—say a car, a locomotive, a water chute, a racing horse etc. rapidly advancing towards him.

The object of the invention is to provide a variable focus lens of improved design which presents valuable features and advantages from technical and economical points of view over other variable focus lenses of known design.

A retrospective review of the prior art will enable the reader to more fully understand the objects of my invention and its salient features by which said objects are attained in practice.

For the production and the projection of motion pictures, varying in size, adjustable lens systems are known, composed of two lens units, the equivalent focal length of which can be continuously changed in an uninterrupted action by the operator within certain limits.

In working with these lenses the camera and the objects to be photographed or the lens and the film gate of the projecting apparatus remain in fixed position relative to each other—in contradistinction to another widely used method in which the photographic camera having a lens with a fixed focus must be wheeled towards the object to be successively photographed in enlarged size.

However as the variable focus lenses concerned are adjustable only over a narrow range, the greatest possible enlargement not exceeding in practice 2:3, their usefulness is restricted.

With the object of providing means for the production and projection of motion pictures presenting greater enlargements and higher magnoscopic effects than known heretofore, adjustable lenses of the variable focus type, so-called triplets, have been made and brought on the market of late by lens manufacturers.

Said triplet lenses usually consist of three lens units, adapted to slide in a barrel, hereinafter called lens barrel, and are provided with shifting means which are adapted to displace the said lens units in relation to each other at specific ratios of speed.

The said means for shifting the lens units comprise pin and slot gears having three helical guide slots and three rectilinear guide slots respectively. By revolving an impeller sleeve attached to the lens barrel the said lens units are axially displaced from their zero position, nearest to each other, into their extreme position farthest from each other.

Since motion picture theatres numbering about 90,000 are at present of greatly different size, viz. their screen distance from the projection apparatus being from 50—200 feet, manufacturers of variable focus lenses are compelled to make and keep in stock at their agents' depôts complete sets consisting of a great number of specimens of variable focus lenses graduated as to screen distances,—viz. individually distinguished from each other in the different pitches of the change focus gears concerned.

Hence, because of the large capital invested in the many rather costly lenses to be kept in stock and of the trade risks involved variable focus lenses are relatively high in price.

Moreover for similar reasons of economy it is impossible for film exhibitors travelling from town to town to carry with them a complete set of those costly lenses for different screen distances to be found in different places.

Other objects of the invention will incidentally become apparent hereinafter to lens makers and practitioners in the motion picture field.

The nature and scope of the invention are briefly outlined in the appended claims and will be more fully understood from the following specification taken together with sheet 2 and 3 of the accompanying drawings in which:

Figs. 1 and 2 are longitudinal sections through a variable focus lens of the triplet type re-designed according to this invention and shown by way of example, Figs. 3 and 4 are intended to elucidate diagrammatically the function of variable focus lenses redesigned for unrestricted application.

In the drawings 4, 5, 6 designate the lens units, which are slidably arranged in the lens barrel 2, and are adapted to be simultaneously axially displaced in the direction of the arrows a4, a5, a6 in specific relations to each other by shifting means of appropriate design:—

The latter comprise with the embodiment of the invention shown by way of an example 1. A stationary main barrel 1, 1' in which rectilinear slots 13, 14, 15, extending longitudinally therein, are provided, and in which the lens barrel 2 is rotatably mounted;

2. Helical slots 8, 10, 12 which are provided in the lens barrel 2,

3. Sleeves 20, 30, 40 which carry said lens units 4, 5, 6 and have pins 7, 9, 11 attached respectively, the latter projecting into said helical and rectilinear slots;

4. An impeller sleeve 3 which has a milled collar 3'' and is secured at 3' to the lens barrel 2, and by which the latter can be manually revolved.

I have found that a convenient and simple way of redesigning variable focus lenses for the purposes set forth is to provide additive adjusting means for individually readjusting the basic distance of one of the lens units 4, 5, 6 from its neighbour, independently of the displacements of the latter by the change focus gears. For practical reasons I prefer to provide one of the outer lens units 4 or 6 with the said additive adjusting means:

In the embodiment of the invention shown by way of an example, lens unit 4, which is opposed to the screen and is obviously the best accessible, has been chosen for effecting the displacement in accordance to changes of screen distance: Lens 4 is fitted in a separate mount piece 22 which is provided with a milled collar 22' and fine screw threads 21, and whereby it is adjustable in the sleeve shaped carrier member 20. The latter is provided with a dial graduated for screen distances which are marked circumferentially thereon in feet or meters and with which a pointer line 23 marked on the collar 23' can be brought into register by manually turning the mount piece 22 around the optical axis of the lens.

After the lens unit 4 has been displaced and re-set for the screen distance required, the clamping screw 24 is tightened and the lens is then ready for work.

As a matter of fact on re-adjusting the lens system from a screen distance of say 120 feet to a screen distance of 100 feet lens unit 4 must be displaced so far as it would have to be displaced if using it singly without the other lens units and focussing it for said new distance of 100 feet.

The effect of displacing lens unit 4 will be better understood from the diagram shown in Figs. 3 and 4. Light ray 25 coming from the film 16 and passing through lens units 6, 5, 4, which are initially in the relative position shown in Fig. 3, will produce a sharply defined picture on screen 26 supposed to be at a distance of 120 feet.

In order to produce a sharply defined picture on the screen 27 which is nearer to the lens (D=20 feet) the lens unit 4 must be removed by the screw gear 22—20 from lens unit 5 through a certain distance d in ratio to the focal length of lens unit 4; in which case (Fig. 4) the light ray 25' will pass through the lens unit 4 shown in full lines at a zone closer to its circumferential edge and is consequently refracted through a larger angle than in Fig. 3 with the result that a sharp picture is projected on screen 27 nearer to the lens.

Various changes and modifications may be made in the structural details of variable focus lenses of improved design described above and in the assembling and cooperation of their component parts without departing from the spirit and the salient points of this invention.

For instance lens units 5 or 6 may be selected instead of lens unit 4 for providing one or both of them with re-setting means for adapting the lens to different screen distances. Instead of a screw gear 20—22 another type of gear may be conveniently used.

As indicated above the invention can be used to equal advantage in connection with the production of motion pictures, viz. for making change-focus camera lenses which can be adapted to different distances of the object or scene from the camera, and I wish the claims to be understood as including picture projecting and picture producing lenses.

Instead of rectilinear guide slots, pins and helical slot gears, other types of gears such as differential worm gears, rack and pinion gears etc. may be used to advantage for individually displacing, in relation to each other, the units of the lens system so as to change its equivalent focus.

In practice it rarely occurs that a change focus lens designed according to this invention for projecting pictures must be re-adjusted by the projectionist himself to a different screen distance; the outstanding advantage obtained by the invention lies in trading facilities and economies, inasmuch as the manufacturers and their agents need only keep in stock lenses of one standard size, each specimen of which can be readily re-adjusted to any screen distance to suit local requirements.

Likewise with change focus lenses designed according to this invention for taking pictures on sensitized films there are comparatively few cases in practice where the photo-taking operations must be stopped for re-adjusting the lens to a different distance of the object. For this and other reasons auxiliary or accessorial contrivances, such as an exchangeable mount piece 22 of extraordinary length which would be always in reach by the operator can be dispensed with in general.

What I claim is:—

1. In a change focus lens the combination with a lens barrel of a plurality of spaced lens units slidably arranged within said lens barrel, shifting means for simultaneously displacing axially said lens units in fixed relations to each other and adjusting means for individually readjusting the basic distance of one single lens unit from its mates,—said shifting means comprising a stationary main barrel, in which the lens barrel is rotatably mounted, a tubular impeller member for revolving said lens barrel, sleeves carrying the said lens units, and pin and slot gears cooperatively interconnecting the said sleeves, the lens barrel and the main barrel.

2. In a change focus lens the combination with a lens barrel of a plurality of spaced lens units slidably arranged within said lens barrel, shifting means for simultaneously displacing axially said lens units in fixed relations to each other and adjusting means for individually readjusting the basic distance of one single lens unit from its mates,—said shifting means comprising a stationary main barrel, in which the lens barrel is rotatably mounted, a tubular impeller member for revolving said lens barrel, sleeves carrying the said lens units, and pin and slot gears cooperatively interconnecting the said sleeves, the lens barrel and the main barrel,— said adjusting means comprising a dial circumferentially provided on the sleeve which carries one of the lens units, a separate mount piece in which the lens unit concerned is mounted, said mount piece being cooperatively associated with the said sleeve by screw threads so as to be adapted to be rotated and concurrently axially displaced relatively to the said sleeve, and a pointer line provided on said mount piece for cooperation with the said dial.

HELMUT NAUMANN.